United States Patent

[11] 3,552,654

| [72] | Inventor | Lewis C. Thomas<br>3204 NW 61st St. Terrace, Oklahoma City, Okla. 73112 |
|---|---|---|
| [21] | Appl. No. | 835,303 |
| [22] | Filed | June 18, 1969 |
| [45] | Patented | Jan. 5, 1971<br>Continuation of application Ser. No. 648,078, June 22, 1967, now abandoned. |

[54] IRRIGATION CONDUIT AND COMPOSITION AND METHOD FOR PRODUCING SUCH
5 Claims, 6 Drawing Figs.

[52] U.S. Cl. .................................................. 239/145,
239/450, 239/542, 239/559, 239/567, 239/568
[51] Int. Cl. .............................................. A01g 27/00
[50] Field of Search ............................................ 239/145,
450, 542; 138/124—140; 264/48, 51

[56] References Cited
UNITED STATES PATENTS

| 1,989,427 | 1/1935 | Robey | 239/145 |
| 2,174,600 | 10/1939 | Schutmoat | 239/145 |
| 2,461,594 | 2/1949 | Founders | 138/137 |
| 2,705,662 | 4/1955 | Leonard | 239/450 |
| 2,771,320 | 11/1956 | Korwin | 239/450 |
| 2,807,505 | 9/1957 | Weitzel | 239/145 |
| 3,281,513 | 10/1966 | Stripp et al. | 264/48 |
| 3,299,192 | 1/1967 | Lux | 264/48 |

Primary Examiner—Lloyd L. King
Attorney—Bacon & Thomas

ABSTRACT: The invention is directed to a composition and the use of this composition to the production of particular articles of manufacture commonly known as irrigation or soaking conduits. According to the process of the invention, a foamable thermoplastic resin composition is extruded in such a way so as to obtain a conduit having a wall structure composed of a cellular body of interconnecting pores. During the extrusion process, the outer surface of the conduit is treated in such a way so as to produce an outer surface or skin which is substantially impervious to water. The conduit thus prepared is then provided with a score line or score lines which destroy the water-impervious nature of the outer surface. In use, these conduits are maintained under water pressure which causes the water seep through the pores of the wall and ultimately to the score lines which permit the water to seep from the conduit. The irrigation or soaking of lands is thereby obtained.

PATENTED JAN 5 1971
3,552,654
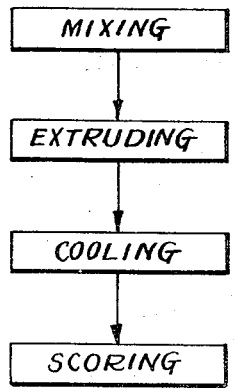
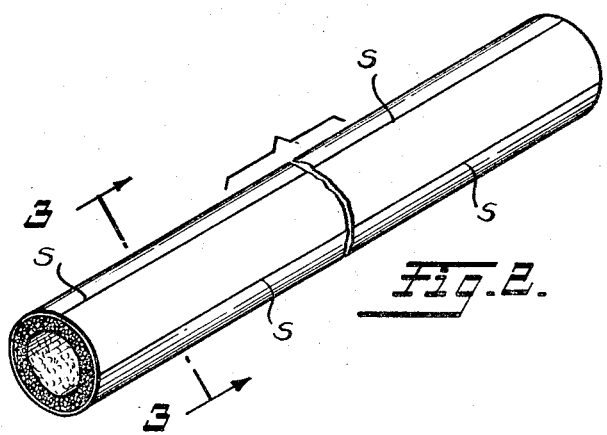
Fig.1.
Fig.2.
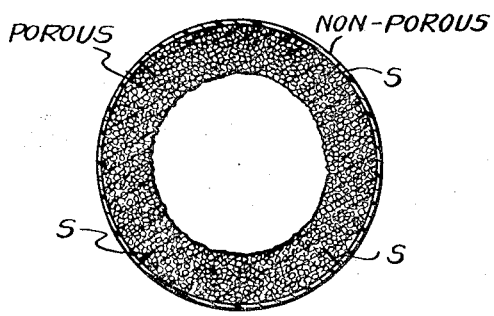
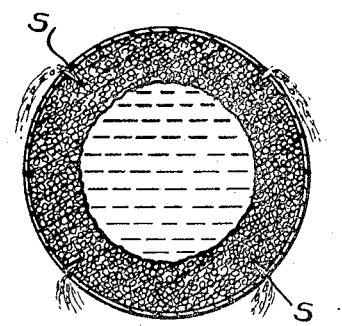
Fig.3.
Fig.4.
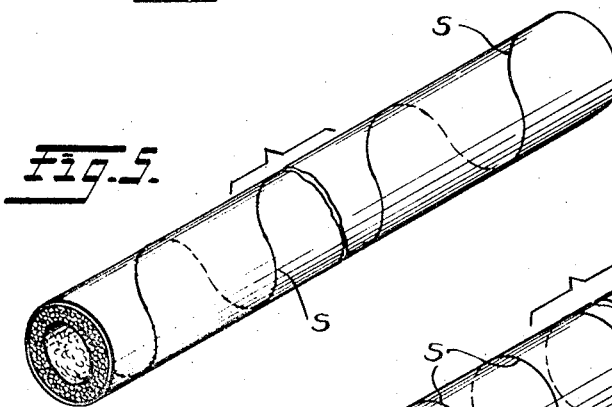
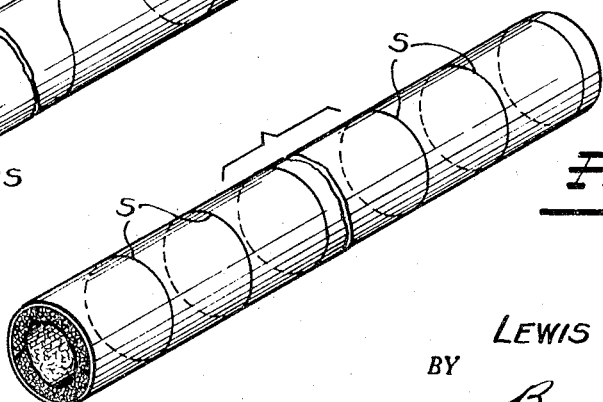
Fig.5.
Fig.6.
INVENTOR.
LEWIS C. THOMAS
BY
Bacon & Thomas
ATTORNEYS

IRRIGATION CONDUIT AND COMPOSITION AND METHOD FOR PRODUCING SUCH

This application is a continuation of application Ser. No. 648,078, filed Jun. 22, 1967, now abandoned.

BACKGROUND OF THE INVENTION

The invention described in greater detail herein is directed to irrigation conduits and methods and compositions for producing these conduits. The irrigation or soaking of cultivating lands over the years has presented some unique problems perhaps only appreciated by those who are directly concerned with this area. Because of these problems much work has gone into the development of water carrying systems which will operate automatically and efficiently. The continued search for new devices and new materials to produce these devices has been stimulated in recent years since many areas, which normally receive adequate rainfall during the cultivating months, have experienced lesser amounts of rainfall than normal. As a result there has been considerable economic loss due to the combination of inadequate rainfall and inefficient irrigation systems.

Over the year various conduits ranging from sprinkling hoses to seeping hoses have been produced and have appeared on the market. Since each of the conduits presently used has some particular disadvantages, additional sophisticated devices and attachments have been proposed for modifying the existing structures. In addition, various materials have been substituted and used in attempts to overcome problems associated with still other type conduits.

Devices which have been developed for the irrigation of cultivating lands or more specifically for supplying water to farmland, lawns and the like fall within two categories. In the first category are included sprinkling devices which spray water onto the area to be watered in the form of a stream, sprinkle or mist. The second category of devices is a conduit which does not sprinkle or spray the water but merely allows the water to seep through the surface of the conduit and along its entire length by means of perforations. The areas around the conduits are thereby watered or soaked.

The present invention is concerned with the second category of devices more commonly referred to as "soaking conduits." Soil soaking hoses or conduits in themselves are well known as evidenced by the fact that various U.S. patents have issued which are specifically directed to this type device. As examples of those patents may be noted U.S. Pat. Nos. 1,989,427; 2,595,408 and 2,807,505. One of the first soaking devices used which has found limited success is a hose fabricated from canvas. This product and some of its shortcomings are described in U.S. Pat. No. 2,807,505 referred to above. This patent in turn describes a soaking device which is stated to overcome some of the disadvantages of the canvas soaking hose.

The hose of the above-mentioned patent seeks to duplicate the highly effective soaking characteristics of the canvas hose and at the same time eliminate the inherent kinking, rotting or creasing drawbacks of that type hose. The hose described in U.S. Pat. No. 2,807,505 is produced from a foamable plastic which upon extrusion gives the hose a wall structure composed of a multiplicity of interconnected irregular shaped pores. According to the description of the patent, the water contained in the hose is forced by the pressure of the water entering the hose from the sources through the pores of the wall structure and out of the porous exterior surface. As can be readily appreciated a hose functioning in this capacity must possess a structure sufficient to withstand the internal pressures of water since the only outlet for the water is through the porous wall. In order to obtain this flow the hose must be maintained under constant pressure.

The most significant problem which must be overcome in the production of a hose is utilized in this manner is to obtain a hose structure which will not only sustain the aforementioned pressures but which will also permit the even distribution of water over the entire length of the hose. For example, when one considers the use of a length of hose measuring 100 feet or more, the pressure necessary to cause the flow of the water through the wall structure must be sufficiently distributed throughout the entire length of the hose; otherwise, that portion of the hose closest to the supply of water would release a large amount of water thereby reducing the pressure to such an extent that there would not be sufficient pressure in that portion of the hose farthest from the supply to cause the water to flow through the walls. This in effect would lead to substantial soaking in the area with perhaps only limited, if any, soaking in the area farthest from the source of water. This, of course, is most undesirable both from an economic standpoint and from the handling aspect.

Therefore, it is quite apparent that although these conduits appear superficially to be quite simple in structure, this initial impression is quite deceiving and when the mechanics, the economics and the handling requirements are considered, it is quite clear that the production of a conduit necessary to meet all of the essential prerequisites is in fact quite complicated. Foe example, the problem of obtaining an even distribution of water over the entire length of a conduit measuring 100 feet or even 500 feet in itself has been a rather perplexing problem. The conduit must be capable of passing approximately the same amount of water at the portion of the conduit farthest from the supply as that passed at the portion closest to the water supply. The water seepage can be controlled and an even distribution of the water can be attained with the conduits of the present invention because of the applicant's discovery.

OBJECTS AND GENERAL DESCRIPTION OF THE INVENTION

The present invention as earlier stated has as one of its objects the production of a soaking conduit which not only possesses antideterioration properties, i.e., rotting, but which also permits the even soaking of areas without the attendant disadvantages of the prior art conduits.

The conduits of the present invention permit the even distribution of water over large areas without the necessity of continual observation or handling since the conduit as produced permits the even and gentle flow of water over the entire area covered by the conduit.

The objects as above mentioned are made possible only through the obtention of more intermediate objects which include the formulation of thermoplastic compositions which in turn give the final product of the invention the physical and mechanical properties which are the necessary prerequisites for the ultimate and efficient use of the conduit. More specifically, the compositions are those which when extruded and treated yield conduits having walls which are in the form of a porous structure and composed a multiplicity of interconnected pores of such size, distribution and degree of interconnection that water under pressure within the conduit will flow through these pores and eventually through scorings which are provided in the otherwise water-impervious or water-impermeable exterior surface of the wall structure.

One of the primary objects of the invention is to produce a conduit possessing a wall structure which is composed from the interior to exterior of a cellular plastic material. Moreover, the conduit is prepared in such a manner that the exterior surface of the conduit is substantially water impervious or water impermeable. The outer surface of the conduit is provided with a score line or score lines at a predetermined location or at predetermined locations which destroy the water impervious nature of the outer surface in that or those locations.

In addition, the invention has as one of its objects the method of preparing the above-described conduits from the previously mentioned compositions.

Other objects and additional applications of the present invention will be apparent from the detailed description which will follow.

The objects of the invention are accomplished generally by extruding a foamable composition comprising a thermoplastic resin, an agent which releases gases, ore more commonly referred to as a blowing or foaming agent, and an oil through a die to obtain a conduit of a predetermined shape.

At the head of the extruder is attached the die carrying a cooled sizer which in turn cools, sizes and hardens the exterior surface of the conduit as it comes from the die. In this manner a skin which is impervious to water is produced on the outer surface. Air is forced through the extruded conduit as it enters the sizer to ensure that the conduit is expanded so as to come into intimate contact with the sizer thereby assuring the obtention of the water-impervious outer surface or skin. The conduit is cooled and then brought into contact with a scoring device which produces a score line or slit in the outer surface which may penetrate the wall to a depth of one-half the wall thickness. The score line may run continuously along the length of the hose and longitudinal to the axis of the conduit or it may be noncontinuous or have other configurations which are exemplified in the drawing of this specification.

The extruded conduit may then be cut into desired lengths and provided with the conventional coupling devices for attachment either to other sections of conduit or to the faucets which supply the water. Since one end of the conduit must be sealed to ensure that the leakage will take place along the length of the conduit, the coupling device may be fashioned so as to operate as either a means of attachment for an additional section of hose or as a means to fit a cap which will seal the end of the conduit. Of course, the wall of the hose at the end to be sealed may be fused together thereby creating the necessary seal. The fusing may be performed either mechanically or physically, that is, by the use of various mechanical pinching devices or by simply heating the conduit at the appropriate place and heat fusing the walls together.

A more complete understanding of the products of the invention and the method of manufacturing such can be obtained by a consideration of the accompanying drawing, in which:

FIG. 1. is a flow diagram of the primary steps of the process for the manufacture of the conduits of the the invention;

FIG. 2 is a view of tubular or hose form of the conduit showing the scoring lines running continuously and longitudinal to the axis of the hose and positioned at the quarter marks of the circumference of the hose;

FIG. 3 is a cross-sectional view of the hose of FIG. 2 when that hose is cut along line 3—3;

FIG. 4 is the view of FIG. 3 when the hose is filled with water and the score lines are partially opened by the pressure of the water on the walls of the hose which in turn permits the seepage of the water from the hose; and FIGS. 5 and 6 depict the variations in the pattern of the scoring which are possible and of course, are not to be construed as limiting.

Referring to the drawings in more detail, the conduits of the present invention are shown for example in FIG. 3 and as explained in FIG. 4, possess a cellular structured wall through which water under pressure seeps. Since the exterior surface or skin is not previous to water, the water must seep or be pressured to flow toward the score lines (or slits) designated as "S. Since the score lines destroy the water-impervious nature of the outer surface, the water seeps through these lines and then flows from the conduit as shown in FIG. 4.

Although the conduit is drawn in tubular form and possessing four score lines (running the entire length of and longitudinal to the axis of the conduit) it is clear that the hose may be of many shapes, for example, square, spherical, etc. and the number of score lines can be varied depending upon the amount of water the worker desires to have flow from the conduit. The same is equally true with respect to the depth of the score. The depth of the score may range from the mere slitting of the water-impervious skin to as much as 50 percent of the wall thickness. Applicant has found that a tubular conduit having four score lines located at the quarter marks of the circumference, each having a depth of from 20 to 50 percent of the wall thickness operates particularly well from the standpoint of soaking times and water flow. Of course, the wall thickness must be of sufficient size to withstand the pressures generated within the conduit. For example, a 500 foot length of a tubular conduit produced from medium density polyethylene having 1 inch outside diameter and a wall thickness of three-sixteenths of an inch operates quite effectively under a pressure of 60 pounds per square inch. Accordingly, the worker in the art after considering his particular requirements can determine the size conduit, the number of score lines and the depth of the score lines necessary to perform the desired function.

A wide variety of thermoplastic resin materials can be used in the formation of the irrigation conduits of the present invention. Ethylene polymers and copolymers (such as ethylene-ethylene acrylate, Sp.G. 0.93 and ethylene-vinyl acetate Sp.G. 0.92) and propylene polymers and copolymers give particularly good quality conduits. Other plastic materials such as the semiflexible forms of nylon and vinyl resins and in particular, vinyl chloride polymers which are modified with small amounts of vinyl acetate can be used. The only prerequisites for the plastic material is that it can be foam extrudable and possess a structure after extrusion which although flexible to a certain extent, is sufficiently rigid to retain the shape of a conduit even when not in use and sufficiently rigid to virtually eliminate the problem of kinking when the conduit is laid out for use. Medium and low density polyethylenes have been found to be particularly suitable for the purpose since these polymers are foamable, have the prerequisite physical properties, are particularly resistant to deterioration and give the most uniform porosity when foam extruded. The conduits produced from the formulations of the invention possess a balance of flexibility and rigidity which allows them to be easily handled and placed while at the same time allows for its expansion under the operating pressures. In addition, the conduits are sufficiently rigid to maintain their shape when not in use and at the same time of sufficient strength to permit normal handling together with the capacity to take the impact or support loads without fear of irreparable damage.

The second ingredient of the resin formulations which in effect creates the foamed or porous cellular structure is an agent which releases gases when exposed to heat. These agents, commonly referred to as "blowing agents," by the evolution of gas cause the semisolid and hot plastic material to expand so as to form the porous structure. A number of different compounds perform in this manner and as exemplary may be mentioned sodium bicarbonate, ammonium bicarbonate, ammonium carbonate, ammonium sesquicarbonate, etc. In addition to those agents mentioned such organic agents such as N, N' dinitrosopentamethylenetetramine, N, N'-dimethyl-N, N' dinitrosoterephthalamide, benzene-1,3-disulfonyl hydrazide, azobisforamide and like compounds. The formulation can contain from 1 to 3 percent by weight of the thermoplastic resin weight and preferably from 1.5 percent to 2 percent by weight.

In addition to the above, a small amount of lubricating or machine oil is included in the formulation. The inclusion of the oil has a marked effect on the ease of the extrusion and the properties of the final conduit. Although applicant does not wish to be limited to his theory as to how the oil functions in the formulation since it is only speculation, the oil appears to function in various capacities. It most probably serves as a lubricant during the extrusion procedure; it permits the obtention of an even coating of the blowing agent in each of the resin pellets and since the thermoplastic granules are coated very lightly with the oil during the mixing processes, the resin granules upon being melted and extruded although they combine to form the desired structure, not not knit as tightly as they normally would without the oil and therefore permits water seepage through the wall structure in a more uniform manner. The combination of the resin, the blowing agent and the oil and in particular the combination of low density or medium density polyethylene, sodium bicarbonate and a naphthenic machine oil having as Saybolt Seconds Universal viscosity of 100 at 100° F. yields a conduit with a uniform porous structure which, when slit according to the invention and used as described produces a uniform distribution of the water to the area to be soaked.

In addition to the above-mentioned oil may be used oils having the following characteristics:

| Lubricating oil | 1 | 2 |
|---|---|---|
| Gravity, ° API | 31.8 | 33.8 |
| Clash, ° F COC | 375 | 395 |
| Cold test, ° F | +6 | +4 |
| Viscosity, SSU at 100° F | 105.1 | 109.3 |
| Viscosity Index | 106.4 | 110.5 |
| Color ASTM D-1500 | 3.5 | 2.5 |

Typical naphthenic lubricating oils derived from naphthenic crudes such as oils having the following characteristics can also be used:

| Lubricating oil | 3 | 4 |
|---|---|---|
| Gravity, ° API | 23.2 | 24.4 |
| Viscosity, SSU/100° F | 150 | 99.89 |
| Viscosity, SSU/210° F | 41.1 | 37.7 |
| Power, ° F | +10 | −55 |
| Specific dispersion | 129.6 | 132.8 |
| Percent parrafins | 7.7 | 4.6 |
| Naphthenes | 5.1 | 5.0 |

A particularly good oil is a refined lubricating oil which has the following characteristics:

| Viscosity at 100° F. (SSU) | 107 |
|---|---|
| Viscosity at 210° F. (SSU) | 39.5 |
| Viscosity Index | 80 |

13% aromatics an average of 1.2 aromatic rings per molecule and 1.6 naphthylene rings per molecule with an average molecular weight of 336.

The oil as earlier stated is included in small amounts, for example, a formulation containing 50 pounds of medium density polyethylene, 12 ounces of sodium bicarbonate will contain about 24 drops of oil. However, as is obvious, this amount of oil operates quite effectively for this formulation and the worker in the art will readily realize that certain adjustments in this amount can be made depending of course on the product desired, the viscosity of the oil, the type resin utilized and the extrusion conditions. However, in any instance the oil content of the formulation does not exceed 100 drops per 50 pounds of resin or is less than 10 drops for the same amount of resin.

As will be appreciated additional agents, for example, coloring agents, mildew growth resisting agents, fillers, etc. can be added to the formulations so long as the agents do not change the basic characteristics of formulation and do not effect the eventual obtention of conduits possessing a uniform distribution of pores or cells.

As depicted by the flow diagram of FIG. 1 of the drawing, a mixture of the resin granules, the blowing agent and the oil is placed in a mixer which by a tumbling and mixing action insures that the resin granules are covered by a fine coating of oil.

Preferably the resin is placed in the mixer first and then the oil is added. The two ingredients are mixed for a time sufficient to obtain the coating as above described. The blowing agent is then added and the mixture again mixed until the resin granules or pellets each have a uniform coating of the blowing agent.

The material is then ready for extrusion and ancillary treatments so as to produce the desired conduit. The preferred extrusion conditions and ancillary treatments will be set forth in the specific examples.

The extruder used is of a conventional type. The dies used are also conventional in nature and modified only to the extent that there is attached directly to the die a sizer preferably made of aluminum. The sizer is designed to be maintained at a cool temperature and acts to harden and cool the plastic being extruded and to thereby obtain the outer water-impervious skin.

SPECIFIC EMBODIMENTS

Having thus described the invention generally, the invention will be described more specifically to set forth the preferred embodiments.

EXAMPLE I

Mixing of Materials

Fifty pounds of low density polyethylene having a specific gravity of 0.910 in pellet form are placed in a mixer which operates by tumbling action. To the polyethylene is then added 24 drops of naphthenic oil having a Saybolt Second Universal viscosity of 100 at 100° F. The polyethylene and the oil are then mixed from 4 to 6 minutes after which time the polyethylene pellets are covered with a fine coating of oil. There is then added to the mixer 12 ounces of sodium bicarbonate and the mixing is continued until the polyethylene pellets are evenly covered with the sodium bicarbonate. When this is accomplished the formulation is ready for extrusion.

Extrusion

The extruder is of a conventional type and operates at pressures which are necessary for the extrusion of the particular plastic materials used. At the head of the extruder is attached a die which, as is well known, shapes the material being extruded into the desired form. Attached directly to the die at its exit point is an aluminum sizer which is designed to have a continuous flow of cold water which maintains the sizer in a cool state.

The extruder possess an electric panel where various barrel temperatures can be controlled. The extruder conventionally has three heated zones. The initial zone which is directly below the feeding inlet is set at a temperature of 300 to 350° F. The second zone is set within the range of 320 to 340° F. and zone three, which is the zone farthest from the feeding zone, is set for a temperature of 340 to 350° F. The head of the extruder is maintained at a temperature of 340 to 360° F. and the temperature of the die is kept between 350 and 360° F. material is then loaded into the hopper of the extruder and then fed into the extruding chamber.

After the material has reached the appropriate temperatures, the material is extruded through the head of the extruder and into the die. As the material exits from the die in conduit form, air pressure at approximately 10 pounds is introduced inside the conduit in order to expand the conduit so as to put the exterior wall of the conduit in intimate contact with the cooled sizer.

The sizer cools and hardens the exterior wall of the conduit and as a consequence creates a skin or outer surface on the hose which is free of any cellular structure and therefore, gives the conduit a water-impervious surface.

From the sizer the hose enters a water tank, where it is completely submerged in the water contained therein. The conduit is cooled and further hardened by this treatment. The extruded conduit is then run through a slitting or scoring device bearing tool steel blades which are adjustable to permit the scoring of the conduit to various depths. The slitting device is so designed so as to enable at least one and up to six score lines to be produced in the hose. Of course, the hose may be run through the slitting device as many times as necessary to obtain the desired number of score lines. The conduit according to this example is scored at each quarter mark of the circumference of the conduit. The depth of the slit is 20 percent of the wall thickness. The pipe produced by this example is tubular in form and has a 1 inch outside diameter with approximately a three-sixteenth inch wall thickness.

The score lines extended continuously for the entire length of the hose which was approximately 100 feet and ran longitudinal to the axis of the conduit. The conduit is then fitted with various coupling devices in order to set the conduit in operation. One end of the conduit is fitted with a coupling device for fastening or connecting a faucet or water supply means. The other end is fitted with a coupling device which is fitted with a cap in order to completely close off that end of the conduit.

Testing of Prepared Conduit

The conduit was then laid out, and the coupling end connected to a faucet. The water leakage for the conduit was measured under certain water pressures. The following table sets forth the particular data determined for this conduit.

| | Length of hose, feet | Minutes of test | Gallons of water leakage |
| --- | --- | --- | --- |
| P.s.i. on hose: | | | |
| 10 | 100 | 60 | 72.0 |
| 15 | 100 | 60 | 88.5 |
| 20 | 100 | 60 | 109.5 |
| 30 | 100 | 60 | 147.0 |
| 40 | 100 | 60 | 186.0 |
| 50 | 100 | 60 | 234.0 |
| 60 | 100 | 60 | 303.0 |

EXAMPLE II

A conduit was prepared according to the process as set forth in example I with the exception that instead of low density polyethylene, a medium density polyethylene having a specific gravity of 0.926 was used.

EXAMPLE III

A conduit was prepared according to the process of example I with the exception that the score lines or slits were made to a lesser depth. The score lines were of such depth that they only penetrated the outer water-impervious skin.

EXAMPLE IV

Example I was repeated with the exception that the conduit made measured 2 inch in outside diameter and possessed a wall thickness of approximately one-fourth inch.

EXAMPLE V

Example I was repeated with the exception that only one scoring was made and this scoring was spiral and ran the entire length of the conduit. The conduit obtained is illustrated by FIG. 5 of the drawing.

EXAMPLE VI

Example I was repeated with the exception that the scorings were made so as to be circumferential and located at distances evenly spaced apart. The circumferential scores were made so as to be one-half inch apart. The conduit as obtained by this example is illustrated by FIG. 6 of the drawing.

EXAMPLE VII

Example II was repeated with the exception that only one score line was made longitudinal to the axis of the conduit. The depth of the score line was approximately 50 percent of the wall thickness.

Since many modifications and variations of the present invention are possible in the light of the above teachings, it is, therefore, to be understood that these modifications and variations are intended to be within the scope of the invention as defined by the appended claims.

I claim:
1. A soil soaker hose comprising:
   an elongated flexible conduit of a length many times its diameter whereby it may be arranged in contact with the ground in any desired configuration to soak soil over a predetermined large area;
   said conduit having a generally cylindrical wall structure of water pervious cellular foamed material;
   the outer surface of said wall structure having a water impervious skin defining said outer surface;
   the inner surface of said wall structure being completely free of impervious skin whereby all of the cells of said material, at said inner surface, are open to the interior of said hose so that water therein may freely enter said wall structure through the entire inner surface of said wall structure; and
   at least one narrow and substantially continuous slit through said outer skin extending substantially from end to end of said conduit, said slit extending into but not through said wall structure, to provide only restricted egress for water along the length of said hose.
2. A hose as defined in claim 1 wherein the outer diameter of said hose does not exceed about 2 inches and wherein the length thereof is greater than 10 feet.
3. A hose as defined in claim 1 wherein the depth of said slit ranges from about 20 percent to about 50 percent of the wall thickness.
4. A hose as defined in claim 1 provided with a plurality of said slits spaced about the periphery thereof.
5. A hose as defined in claim 1 wherein said slit extends helically around the outer surface thereof.